Patented Aug. 9, 1938

2,126,123

UNITED STATES PATENT OFFICE 2,126,123

COMPOSITION FOR WATERPROOFING WOOD

John McArthur, Vancouver, Wash., assignor of one-half to George C. Babcock, Vancouver, Wash.

No Drawing. Application October 27, 1936, Serial No. 107,915

2 Claims. (Cl. 134—78.6)

This invention relates generally to the art of preserving wood and particularly to the formation of a composition for waterproofing wood and a method of forming the composition.

The main object of this invention is the formation of a waterproofing composition which will thoroughly impregnate the cells of the wood from which the pitches and rosins have been extracted in the drying process.

The second object is the production of a waterproofing solution which is capable of use for a wide variety of purposes by the mere variation of certain of its ingredients, such uses ranging from the treatment of finished wood for the reception of a final decorative coating to the treatment of timber ends against checking and the treatment of lumber for use in concrete forms, particular reference being made to plywood or veneered stock which is otherwise impractical to use for concrete forms because of the moisture.

The third object is the production of a composition especially adapted to penetrate the cellular structure of the wood to a relatively great depth and by so doing to completely seal the cells and make them incapable of admitting moisture which would otherwise destroy the wood itself and the glues used in uniting the wood as is necessary in plywood stock.

The fourth object is the production of a penetrating waterproofing composition which may be sanded after being applied without detracting from its waterproofing property, thereby placing it in better condition to receive further coatings of decorating material.

These, and other objects, will become more apparent from the specification following.

Before entering into an explanation of my invention, it must be understood that some of the ingredients which I employ have been used in many different kinds of waterproofing compositions, but these are applied to the surface of the material, or if they are intended to penetrate, do so only a relatively small distance. My composition is not to be confused with other compositions having a rosin base.

In preparing my composition, it is produced in the following relative proportions. First, for the production of each gallon of the product to be made, there is provided eight ounces of glycerin to which is added eight ounces of 40 gr. cider vinegar, which is utilized to cut the glycerin to the desired consistency, that is, similar to the consistency of the product as used in its finished state. This constitutes the first step in the preparation of my composition.

The second step in the process involves China-wood oil, also known as tung oil, to which is added eight ounces of fish oil. These liquids are thoroughly mixed by stirring. To this thoroughly stirred solution is added the mixture described in the first step of the process.

The third step of the process consists of placing a gallon of painter's thinner or petroleum thinner in a vessel to which is added sixteen ounces of powdered rosin. To this liquid is added two ounces of freshly burnt lime. The mixture is then stirred until the rosin and lime have become well mixed and the entire substance is in liquid form. A quart of this finished liquid is drawn off and added to and mixed with liquids described in the first and second steps.

The fourth step consists of placing two quarts of petroleum thinner in a vessel to which the liquids produced in the third step are added. The quantity of petroleum thinner varies according to the particular use to which the composition is to be applied. The material thus made contains the ingredients used in making waterproofed products; however, it has been found in practice that the products named above will have to be varied in the quantity used as the grades of lumber being treated vary, thinning it for some grades and thickening it for others.

The action of the various ingredients is as follows. The glycerin serves as a binder for the gum and oil. The vinegar is used to cut the glycerin. The China-wood oil forms the hard surface on the treated wood. The fish oil provides the waterproofing quality. The painter's thinner or petroleum thinner is used to thin the glycerin to the desired consistency and to improve its penetrating quality. The lime is used to neutralize the composition which has been rendered acid by the vinegar and by the presence of certain acids in the various other materials. The rosin serves as a filler for the wood cells.

While the proportion given for the various ingredients is ordinarily as stated, the glycerin, vinegar, and fish oil may vary from one to ten ounces and China-wood oil may be dispensed with entirely or as much as ten ounces used for the quantity stated. The painter's thinner may vary from one quart to two gallons, the rosin from one ounce to three pounds, and the petroleum thinner from one quart to three gallons. It will be noted that petroleum thinner may be used in place of the painter's thinner in the third step of the process where it is necessary to reduce the cost, although in most cases I prefer to employ the painter's thinner in this step of the process and the petroleum thinner in the last step.

As previously suggested, the main purpose of the China-wood oil is to provide a hard surface, which of course is not necessary on certain classes of work such as concrete forms or timber ends, and the cost of this material renders its use in such cases unwarranted.

With my invention, it is possible to not only restore to the wood cells the original pitches and rosins which have been extracted therefrom in the drying process or their equivalents, but in addition to add enough material to the cells to completely fill the same, making it impossible for water to enter the cell structure of the wood. Repeated tests indicate that when this material is applied to wood, it fairly rushes into the cells until they are completely filled.

The application of my composition to lumber or plywood to be treated is as follows. A suitable quantity of the composition is placed in a container in which is placed the wood object to be treated, provision being made for completely immersing the object and permitting it to remain until the solution has thoroughly penetrated the fibers of the wood, the length of time depending upon the nature and condition of the wood and the purpose for which it is to be used. In ordinary practice, it has been found that about one minute of exposure to the waterproofing solution is sufficient for an ordinary piece of fir or alder plywood. The more porous the piece of wood, the less time is necessary for its saturation. It has been found, however, that it is desirable to allow an ample amount of the waterproofing material to enter the pores of the wood, preferably leaning to an excess.

The wood object is then removed from the container and placed in a drying atmosphere. The time required to dry will depend somewhat upon the proportions of the various ingredients and also the drying conditions. The thinner the waterproofing solution, the less time is required to dry the treated object. For the usual run of plywood or porous lumber, the time required to dry is between two and three minutes. The condition of the atmosphere, as stated, has a determining effect on the time required for drying. If a forced draft is used, the time in which the lumber will dry can be materially reduced.

After a piece of lumber is dried, it may be provided with a finished surface by lightly rubbing it with a very fine grade of sandpaper until the surface is smooth. This will produce a gloss resembling in fir, for example, a golden glow. This surface can be then further finished by painting or otherwise treating it in any manner desired.

If the timber to be treated is too large to be dipped or if it is desired that the ends of the timbers only should be treated, a spray using air as the applying force can be used to place upon the ends of the timbers sufficient quantities of the waterproofing solution to thoroughly close the cells of the wood, which will prevent the timber from checking at the ends. My product is especially useful where extreme penetration is required, where quick drying is necessary, and where cost of the product and its application is a controlling factor.

I claim:

1. A waterproofing composition having in combination in approximate portions eight ounces of glycerin, eight ounces of vinegar, eight ounces of China-wood oil, eight ounces of fish oil, one gallon of painter's thinner, sixteen ounces of rosin, two ounces of lime and two quarts of petroleum thinner.

2. A waterproofing composition consisting of from one to ten ounces of glycerin which is cut with from one to ten ounces of vinegar to which is added from one to ten ounces of fish oil, from one quart to two gallons of painter's thinner, from one ounce to three pounds of rosin, from two to twenty ounces of lime and from one quart to three gallons of petroleum thinner.

JOHN McARTHUR.